United States Patent [19]

Skelham

[11] 3,739,414
[45] June 19, 1973

[54] SHOE MANUFACTURE

[75] Inventor: Ronald Walter Thomas Skelham, Kettering, England

[73] Assignee: The Shoe and Allied Trades Research Association, Kettering, Northhamptonshire, England

[22] Filed: Nov. 23, 1971

[21] Appl. No.: 201,371

[30] Foreign Application Priority Data

Nov. 30, 1970 Great Britain ............... 56,676/70

[52] U.S. Cl. ........................... 12/142 R, 12/146 C
[51] Int. Cl. ............................................. A43d 9/00
[58] Field of Search .............. 12/142 R, 142 G, 12/142 MC, 146 C

[56] References Cited
UNITED STATES PATENTS

| 2,316,045 | 4/1943 | Braga | 12/142 C |
| 2,963,722 | 12/1960 | Stix | 12/146 C |
| 3,329,983 | 7/1967 | Clamp | 12/146 C |

*Primary Examiner*—Patrick D. Lawson
*Attorney*—Lawrence I. Lerner, Sidney David, Joseph S. Littenberg et al.

[57] ABSTRACT

A method of shoe manufacture involving welding together component parts of a blank and subsequently preforming and finishing. In one form the lining is joined to the outer by a tear-seal weld extending along the top line so that at least some lining extends unbroken across the weld line to permit preforming, the waste material being subsequently torn away. Another feature involves joining an insole portion to an outer portion, preforming and removing a gusset from the insole so as to give to the insole the requisite shape and area of a finished shoe insole. Lasting procedures are reduced and closing shop operations performed upon the flat blank before preforming.

17 Claims, 12 Drawing Figures

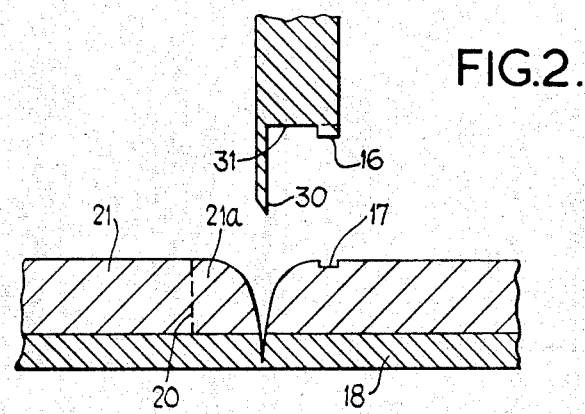
FIG.2.
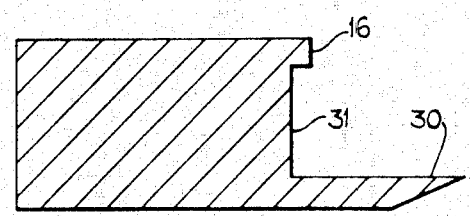
FIG.3.
FIG.11.
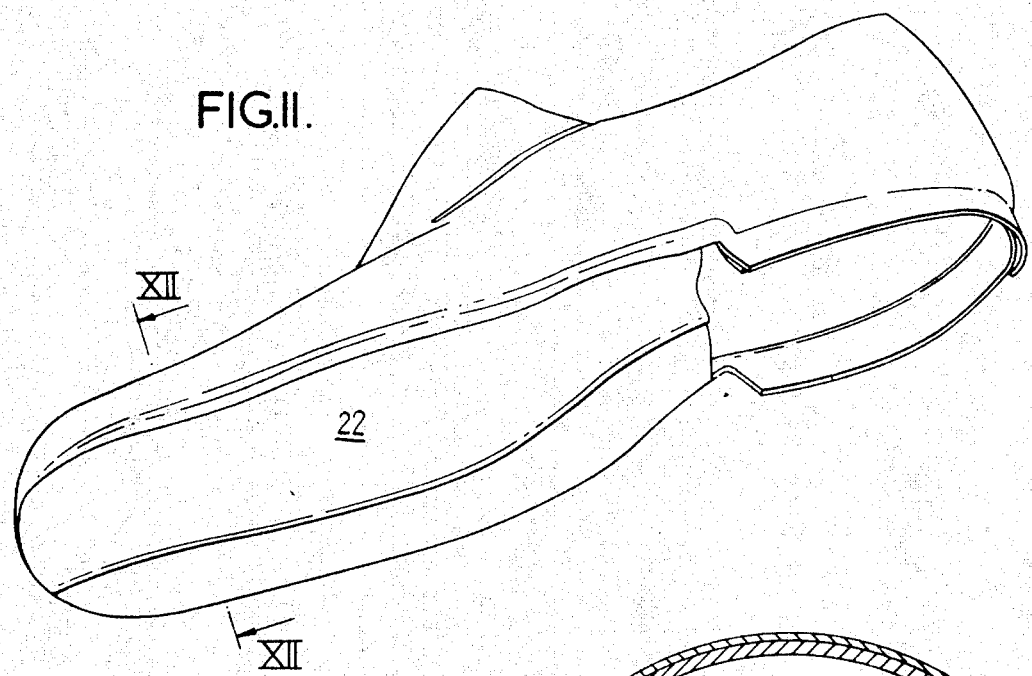
FIG.12.
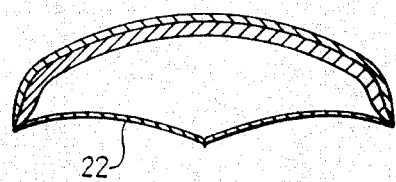

SHOE MANUFACTURE

FIELD OF THE INVENTION

The present invention relates to the manufacture of footwear.

BACKGROUND OF THE INVENTION

With the introduction of new synthetic leather materials for employment as shoe uppers there have been developed new methods of shoe construction. Various preforming methods have been used or proposed which make use of the mouldable or stretchable properties of these materials and which avoid or reduce the time spent bringing the material to shape on a last. By "preforming" is meant a forming operation which takes place prior to or in place of a lasting operation. Such preforming methods include vacuum forming, pressure differential forming and pressure forming. In particular, methods of preforming upper materials to a specified intermediate shape which will be explained have recently been disclosed and for details of these methods attention is directed to U.S. Ser. No. 6837 filed on 29th Jan. 1970 now U.S. Pat. No. 3,641,603, and French Pat. No. 7,022,378 and French Pat. No. 7,039,333. Mechanical methods of preforming devised for use on leather are also suitable e.g. as described in British Patent Specifications Nos. 1,102,695 and 1,102,696. In this method the periphery of the blank is clamped and the upper material is stretched mechanically by means of a mesh former. The invention is employable with all such forming methods.

The new synthetic materials in general are partly or wholly composed of thermoplastic material and are amenable to welding as well as to stitching. The present invention is particularly concerned with the recently developed so called poromeric materials. These poromeric materials, such as are now widely available under the Trade Name "CORFAM," "HITELAC," "ORTIX," "CLARINO," "PORVAIR," are sheet materials comprising a microporous layer of a polyurethane or similar polymeric material. Some materials comprise a non-woven fibrous base layer bonded to the microporous layer and some a further woven fabric interlayer between the microporous and base layers; in such composite materials the bonding agent for the layers is usually polyurethane, or similar polymer, derived from the microporous layer. The microporous layer itself normally comprises at least two zones, analagous to a natural leather, namely an inner zone and an outer grain or finish zone. The poromeric materials are coming increasingly into use in shoe-making, in particular as replacement for leather and other plastics materials in shoe uppers.

While the present invention is applicable with some success to all the types of poromeric material mentioned it is more particularly concerned and has greatest application with poromeric materials which are wholly thermoplastic. An example of such a material is that currently sold under the registered Trade Mark "PORVAIR" which is an elastomeric, thermoplastic, microporous sheet material free from fibrous reinforcements. It is normally dyed or pigmented at least over one surface. For further details of the nature and composition of the material attention is directed to British Pat. No. 1,301,281.

THE PROBLEM

The present invention is aimed generally at reducing the complexity of shoe forming operations and assisting in performing as many operations as possible while the upper material is in a flat condition rather than on the last or in a three dimensional form. At the same time most of the preforming methods above described require that the forming be carried out from a complete sheet or blank material. This prohibits cut-lines and particularly topline shapes being cut out of the blank prior to the forming operation. This in turn means that the preformed blank has to be cut out after it has been brought to a three-dimensional condition. This gives rise to the problem that the three-dimensional blank does not permit conventional knife and parallel-planar-pressure cutting to be used. Tedious hand or continuous feed cutting operations are needed to separate the formed shoe upper from the unwanted parts. Not only are such cutting operations time consuming but the cut edges so formed, in particular the topline edge are often unacceptable in appearance on the finished shoe.

The technique to be described in accordance with the present invention allows these difficulties to be avoided.

However, the present invention goes beyond the mere avoidance of the difficulties outlined above. It opens up the way to further advances in shoe manufacture. While it has already been proposed in the above mentioned patent applications to preform whole uppers as well as foreparts and heel parts, the subsequent operations involve formation of a seam at the heel or at the side and conventional attachment of the sole by lasting e.g. string lasting on to an insole followed by an attachment of the sole, e.g., by moulding. As will become apparent, the employment of the invention enables the manufacture of an entire shoe without any lasting of the forepart. Only the heel requires to be attached to an insole portion.

SUMMARY OF THE INVENTION

According to one aspect of the invention there is provided a method of shoe manufacture which includes the steps of preparing a whole upper blank for preforming from materials which are weldable together either alone or with the aid of a heat-activated adhesive by high frequency welding by attaching an outer portion to a lining portion by means of a tear-seal weld extending along the desired top line so that at least some lining material extends unbroken across the weld line to permit preforming of the resulting blank, preforming the blank and subsequently tearing away the waste material.

By "whole upper blank" is meant that the blank requires closure at a single seam only to complete a continuous surface.

Thus the upper material and lining material may be superimposed and blanks of suitable shape for forming, (e.g., for preforming to the said specified shape) may be cut out. Simultaneously or subsequently all the top line configurations may be defined by tear-seal welds, preferably in one welding and cutting operation.

The cut and welded blank may then be formed by any of the techniques above mentioned (or, if desired, shaped by lasting). To complete the shape of the top line, all that is then necessary is to tear off the unwanted material along the tear-seal weld. This may consist of lining and outer, e.g., in the case of one-piece uppers and of the lining only, e.g., in the case of preassembled uppers. It will be apparent that where "closing shop" operations, i.e., the attachment of stiffeners, puffs, straps, buckles and other apertenances required to be attached may all be performed upon the flat blank, e.g., by welding or stitching before the forming operation which greatly facilitates manufacture.

Thus three-dimensional cutting is wholly avoided and the topline edges of acceptable appearance may be produced. The toplines may however be further finished by the method described in British Pat. No. 1,301,281.

It is not necessary that the outer be in one piece. Where backparts are separate these may be attached by welding or stitching. Whole backparts ready attached by welding to lining material may be attached to foreparts formed in accordance with the present invention.

According to another aspect of the invention there is provided a method of shoe manufacture including the steps of joining an insole portion to an outer portion to form a flat whole upper blank for preforming, preforming the combined blank and removing a gusset from the insole portion so as to give to the insole portion the requisite shape and area of a finished shoe insole.

The invention is more particularly useful where the upper and lining are both composed of wholly weldable, i.e., normally completely thermoplastic materials. However success has been achieved with poromeric materials involving non-thermoplastic reinforcement. Where the lining and upper are not mutually weldable, use can be made of thermoactive adhesive and the expression "tear-seal weld" is inclusive of the use of a thermo-active adhesive between two otherwise unweldable materials.

Any of the aforesaid preforming techniques may be used although where attachments are to be made to the surface of the upper, male formers should be employed. It is preferred to use a superatmospheric pressure preferably in the form of fluid over the grain surface of the upper as described in the aforesaid French Pat. No. 7,039,333.

Preferred forms of the invention are hereafter described with reference to the accompanying drawings in which:

BRIEF DESCRIPTION OF DRAWINGS

FIG. 2 is an enlarged cross-sectional view of a tear-seal weld and electrode, FIG. 3 is an enlarged cross-sectional view of the electrode shown in FIG. 2 giving the dimensions, FIG. 11 is another perspective view of the shoe assembly of FIG. 10 after removal of the gusset and showing the welded inner sole in place, and FIG. 12 is a cross-section along the line XII—XII of FIG. 11.

DETAILED DESCRIPTION OF DRAWINGS

Figure 1:
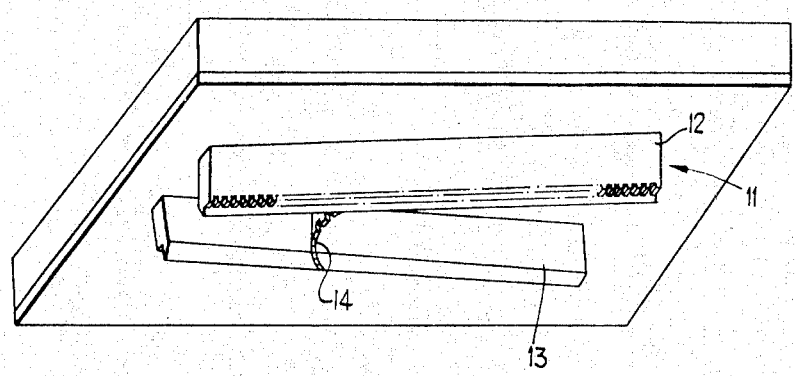
FIG. 1 is a perspective view of the upper and lower platens of a press carrying a tear-seal topline embossing electrode.
Figure 1:
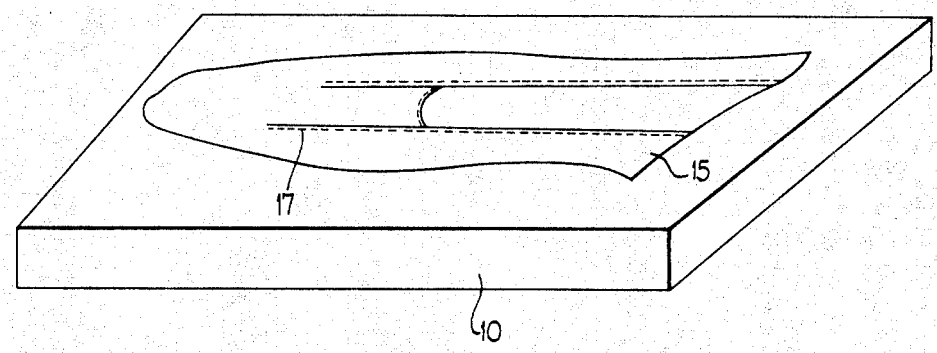

FIGS. 1 to 3 show a press and electrode assembly for performing a tear-seal welding operation on a particular shoe blank for manufacturing an elastic-sided shoe. The lower platen 10 is in the form of a work table against which the electrode 11 attached to the upper platen acts, and is recessed as shown or provided with locating pins for the positioning of a blank the outline of which has been pre-cut. The electrode 11 in the embodiment shown comprises two slightly off-parallel linear components 12 and 13 and a bridging component 14 all of which appear in cross-section as shown in FIGS. 2 and 3, with a knife or blade 30 and embossing projections 16 extending beyond the main end surface 31. The blank shown is a whole upper blank for a shoe arranged for closure at a single seam at the back or heel. The side portions or "legs" 15 will form the sides and heel of the shoe. However the blank may be of the type requiring completion of a side seam instead of a back seam. The dimensions of the electrode members are given in FIG. 3 in this embodiment. The projections 16 are not continuous but form a series of teeth for the purpose of embossing stitch lines as shown at 17. To assist the embossing and tear-seal welding, the electrode is preferably heated.

In tear-seal welding the blank in the embodiment of FIGS. 1 to 5, two flat pieces of permeable synthetic upper material, e.g., Porvair, one serving as the outer and the other as the lining, are cut to the peripheral shape demanded by the particular shoe being made and the method of forming being employed. Suitable thicknesses of material (Porvair) are for example 1.8 mm and 1.0 mm for the outer and lining respectively. However the apparatus is adaptable to different thicknesses by an appropriate adjustment of the high-frequency power, the temperature of the electrode and the stop between the platens. If necessary, the relative spacing of the embossing and knife component, can be altered by changing the electrode. The electrode can be formed, if desired, in two parts bolted together so that one part can be changed. The two materials are placed in correct alignment on the lower platen 10 which is formed as a jig and which fits into a high frequency press of conventional type capable of operating upon the materials in the desired manner. After adjustment of the temperature of the electrode and if necessary the power, the upper platen is brought down against the lower platen up to a carefully adjusted stop resulting in a tear-seal as shown in FIG. 2. This shows the embossment 17 which is an optional feature and the presence and shape of which will vary with the style of shoe. Several rows of stitch lines may be produced if desired.

The seal portion of the tear-seal, i.e., the remaining part of the lower sheet (in the embodiment the lining 18) which extends below the cut should preferably be 0.004 inches thick although this may be varied slightly according to the material used. In general it may vary between 0.002 inches and 0.008 inches. In the electrode embodiment shown which is suitable for the thicknesses of material mentioned, the extremity of the knife 30 stands approximately 0.1 inches beyond the main surface 31 of the electrode and the embossing projections 16 stand 0.01 inches beyond the surface 31. This provides for a tear-seal of 0.004 inches and an embossment to a depth of 0.01 inches on an assembly of materials having a total thickness of 0.104 inches by suitable adjustment of the stop.

In the case of Porvair the electrode is preferably maintained at a temperature of 100° to 180° C, preferably 150° to 160° C, e.g., by the provision of heating elements in the upper platen. A power of three-eighths kw per square inch of electrode surface is normally suitable at a frequency of 15 – 100 mcs. A suitable dwell time, of the order of 5 seconds, may be found by practice depending on the materials used.

It will be appreciated that the configuration of the electrodes will vary from one style of shoe to another in particular as regards the outline of the tear-seal weld produced and the style of embossing. The extent of the electrode may also vary from size to size of shoe.

Figure 4:
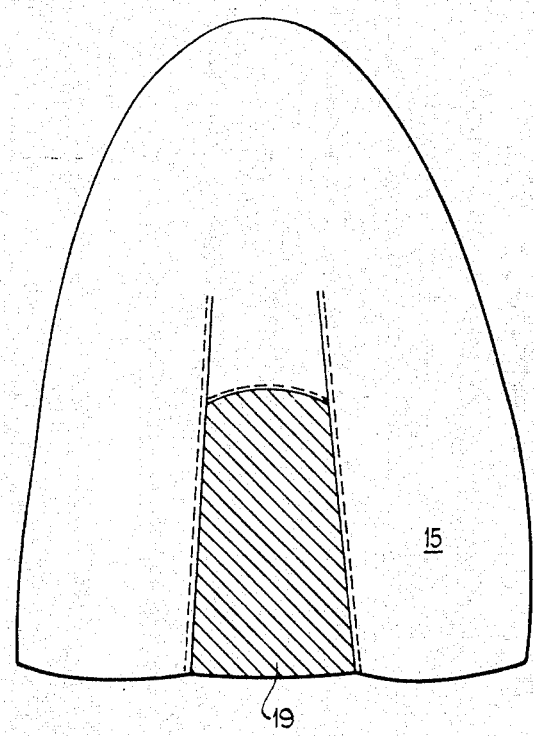
FIG. 4 is a top plan view of a whole upper blank after formation of the tear-seal.

The final form of the blank after the welding operation is shown in FIG. 4. The central web portion 19 remains in place due to the tear-seal in the lining 18. As shown, the whole of the upper over the lining in the portion 19 has been retained. However, it may well be desirable to precut a re-entrant in the upper material itself, e.g., by removing the portion to the left of the broken line 20 in FIG. 2, leaving only a small margin of waste. This will allow the upper material to be cut in an overlapping pattern, at least in some styles of shoe, with a leg portion 15 of another blank cut from the waste material 19 of the first blank. Where conventional lasting is to be carried out subsequently, the lining 18 may be similarly precut. However where the blank is to be preformed, the lining will normally be required to stay in place as the web 19 to enable such preforming operations to be carried out and this constitutes one of the major advances obtained by the invention.

Figure 5:
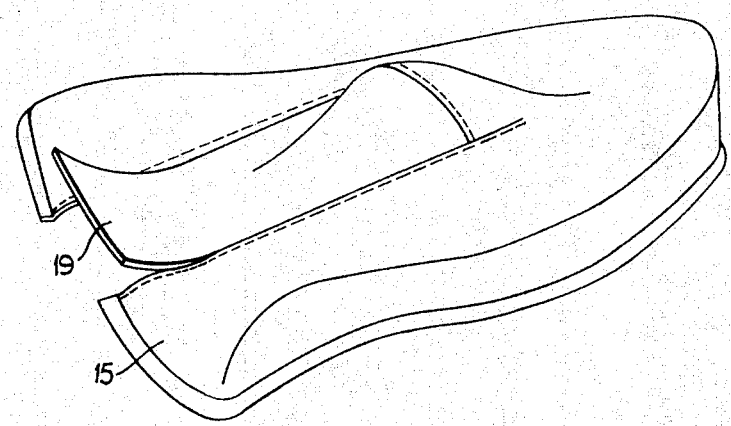
FIG. 5 is a perspective view showing the blank of FIG. 4 after a preforming operation has been carried out.

To continue with the formation of the shoe according to the embodiment of FIGS. 1 to 5, the blank is next preformed to the configuration shown in FIG. 5. While the preforming can be carried out in any desired manner to any desired end configuration, it is preferred, as shown in FIG. 5, to preform the blank to the specified shape mentioned above. For this purpose it is required to treat the combined upper and lining assembly to bring it to a stretchable condition and to conform it to a mould having a moulding surface whose shape is substantially that which would be arrived at by forming a shell of resiliently flexible material to the last shape required and partially flattening out the shell by outwardly displacing the side portions thereof, the upper assembly being so held during the conforming thereof to the mould that the upper and lining materials stretch in conforming to the mould. It is preferred to use the method and apparatus described and claimed in French Pat. No. 7,039,333 in which during conformation to the moulding surface, superatmospheric pressure is applied uniformly against the surface of the upper material to establish contact between all parts of the moulding surface and the inside of the upper.

For further details of the method and apparatus for preforming attention is directed to the latter cited specification.

The final configuration of the blank after preforming is shown in FIG. 5 and the web portion 19 is shown in the process of being torn out. After the web has been torn out the shoe may be completed by any desired known method, e.g., by stitching or welding the back or side seam, string lasting on to an inner sole and injection moulding an outer sole. Elastic, lace holes and/or other closing shop fitments may be provided in place at any stage of the sequence of operations described but it is advantageous to add these fitments while the material is in a flat condition.

FIGS. 6 to 12 relate to a form of shoe construction made available through the employment of the invention and also forming an important preferred feature of the invention and is illustrative of the kind of departure from conventional shoe manufacturing processes opened up.

Figure 6:
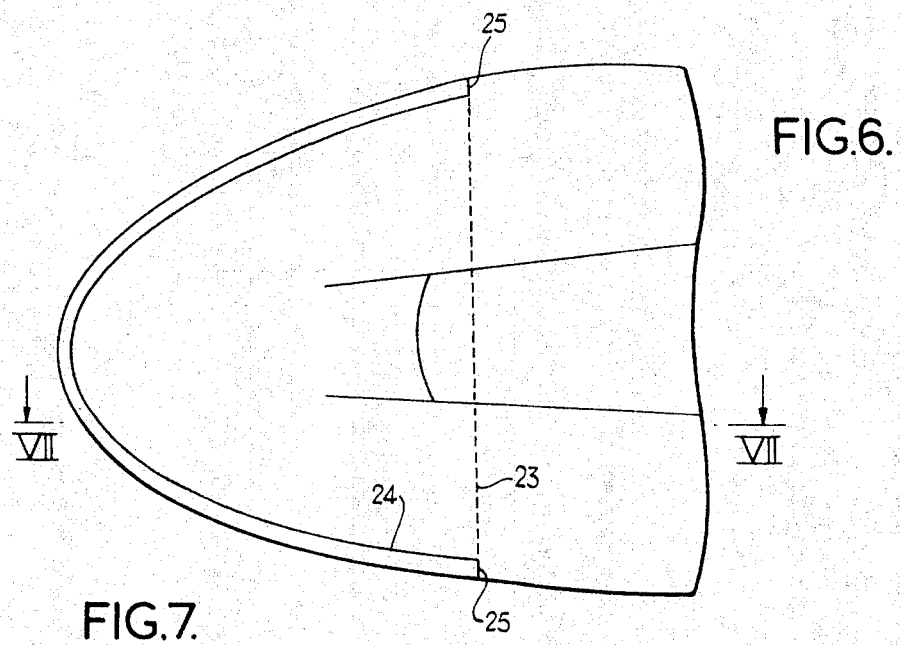
FIG. 6 is a plan view of a blank after tear-seal welding, for forming a shoe with a welded inner sole.
Figure 7:
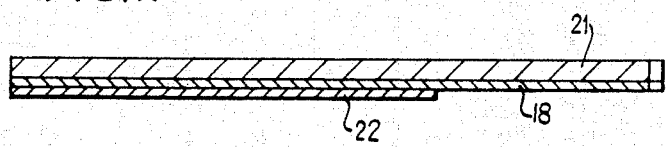
FIG. 7 is a cross-section along the line VII—VII of FIG. 6.

FIG. 6 shows in plan view a blank which in outline and topline is generally similar to that of FIGS. 1 to 4. The same style of shoe would result and the apparatus employed in the embodiment of FIGS. 1 to 5 and the same materials and operating conditions may be used. As in FIGS. 1 to 5 the lining 18 and upper 21 are cut out in outline and placed in the jig in the lower platen 10. In this embodiment however an inner sole (or sock) component 22 is to be attached under the lining 18 along the periphery of the forepart and waist substantially as far as a line 23 which in the finished shoe will lie adjacent to the front of the heel or in the instep area near the heel.

The same considerations apply to the selection of the insole material 22 as apply in the case of the lining 18 and upper 21. Preferably all the materials are of a similar chemical nature and weldable together but again thermo-active adhesive can be used to assist or form the weld. The thickness of material should be suitable for the insole and Porvair poromeric material may be used.

The electrode assembly is augmented by a curved electrode not shown in the drawings but having a knife of outline corresponding to the line 24 of FIG. 6 which extends along the periphery of the blank inwardly from the outer edge at a position which will correspond to the featherline of the finished shoe. This electrode extends rearwardly only as far as the line 23 corresponding to the rear extremity of the insole 22. At the rearward end, the peripheral knife electrode may have outwardly turned "wing" portions adapted to form tear-seal welds along the lines 25 (FIG. 6) to assist in tearing off the waste margin portion adjacent the heel. The line 23 need not be straight but may be curved to take in more or less of the instep region of the shoe.

As described so far, it has been contemplated that the tear-seal welding of the periphery and topline will be conducted in one operation with a combined electrode assembly. In this case, to avoid welding the lining to the insole along the topline region of the electrode a non-weldable material should preferably be inserted between the lining 18 and the insole 22 in the vicinity of the topline electrode assembly 11. A piece of paper is normally sufficient for this purpose.

However, the peripheral weld along the featherline may be performed on a separate electrode and press assembly. This gives the advantages that the same topline shape can be used with blanks of different peripheral shape and allows different operating conditions to be used for two electrodes. Since the peripheral electrode has to weld through three thicknesses of material this is often of advantage although the peripheral electrode can be given a taller or deeper knife and if necessary be heated to a higher temperature than the topline electrode assembly 11.

Figure 8:
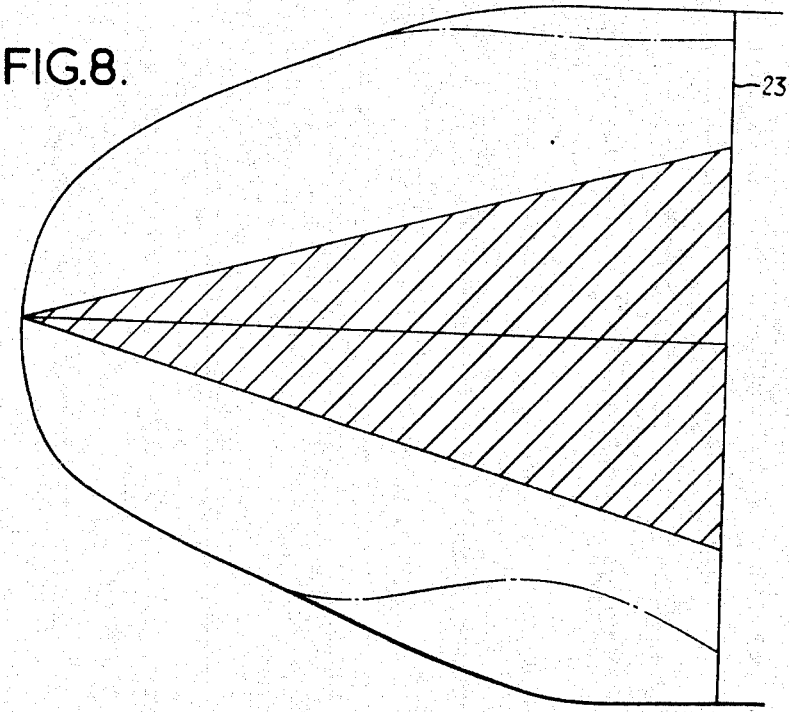
FIG. 8 is an enlarged bottom view of the blank of FIG. 6 showing the gusset to be removed by cut-welding or tear-welding.
Figure 9:
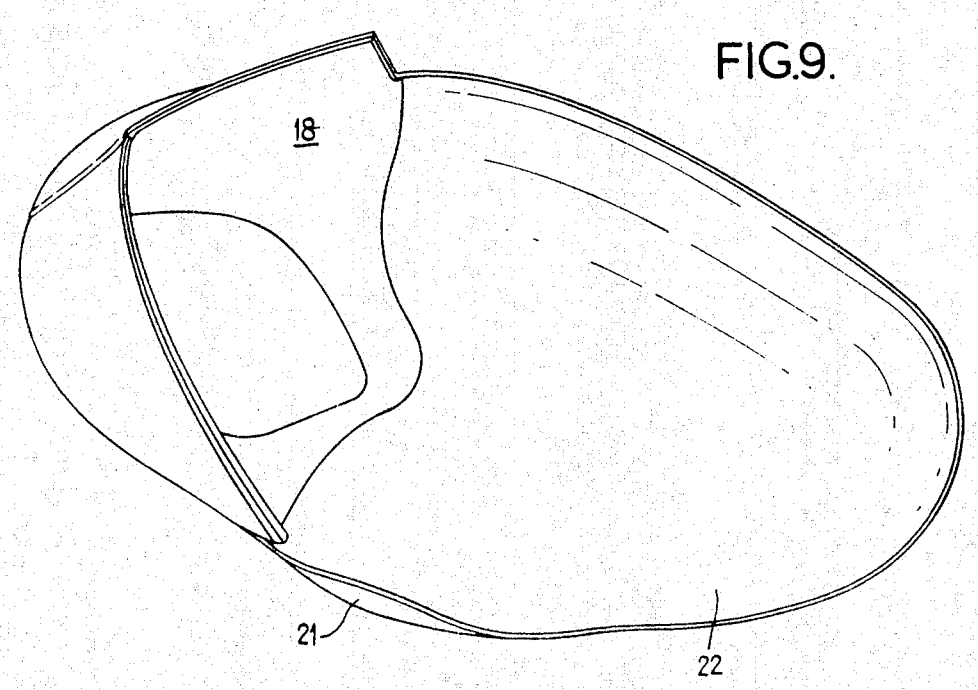
FIG. 9 is a bottom view of the blank of FIG. 6 after a preforming operation has been carried out and after backparts have been subsequently fitted in place by welding.

Prior to or after the welding operation or operations, the bottom of the insole layer 22 is marked with gusset lines outlining a gusset which appears schematically in FIG. 8 and which is of generally triangular shape, coming to an apex at the toe and broadening out at the rear line 23. After the welding operation or operations forming is carried out, e.g., as already described in connection with the previous embodiment, the insole layer 22 lying against and following the contours of the lining and upper 18, 21. The back seam may then be made, e.g., by welding and FIG. 9 shows a welded lap joint produced by high frequency welding. The shoe component will then have the appearance shown in FIG. 9.

Figure 10:
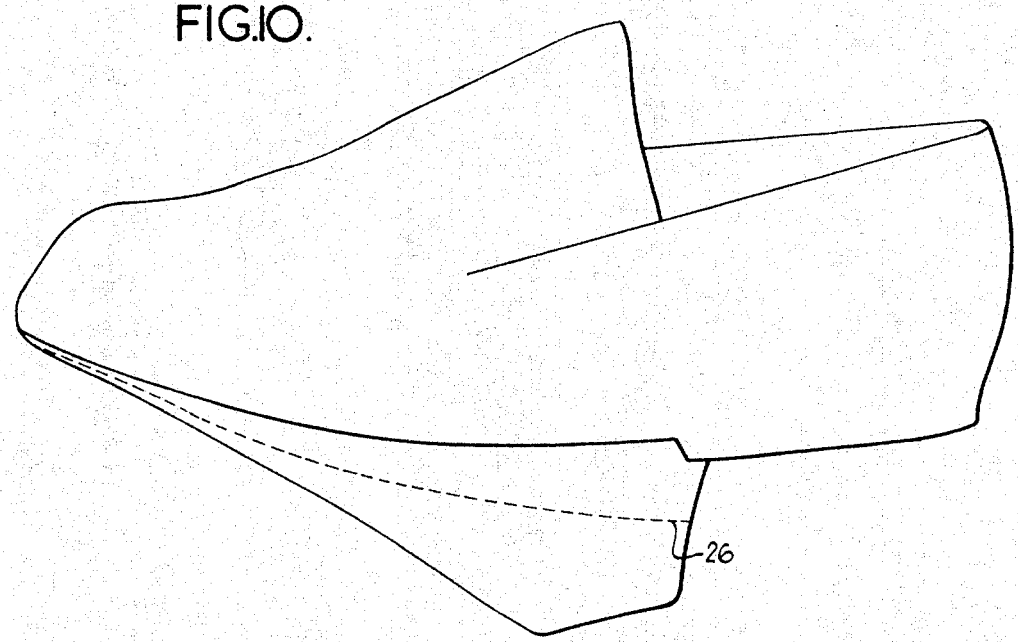
FIG. 10 is a perspective view of the assembly of FIG. 9 prior to removal of the gusset.

Subsequent to preforming, although not necessarily after formation of the back seam, the insole layer is pushed outwardly so as to bow outwards oppositely to the upper portions as shown in FIG. 10 and the gusset region, shaded in FIG. 8, is pinched along the marked gusset lines which appear as a broken line 26 in FIG. 10. The pinched outer region of the gusset i.e. the portion below the dotted line 26 in FIG. 10, is then tear-seal or cut-welded along the line 26 on an electrode press having a single blade electrode of the necessary length and shape. The same operating conditions may apply as described in connection with FIGS. 2 and 3 except of course that the electrode need have no embossing apertenances. The finished appearance of the shoe is given in FIGS. 11 and 12. It should be appreciated that the shape of the gusset as indicated in FIG. 8 is schematic and that the line 26 will normally be somewhat bowed in the plane in which it is welded to take account of the slightly curved shape of the sole, so that the tapering outer lines as viewed in FIG. 8 will normally be slightly inwardly bowed, i.e., towards the central axis line.

Instead of marking the gusset lines before welding the gusset, lines of holes may be punched in the waste material of the gusset (or in the material to be retained if desired) close to the outer extremities of the gusset which will form the line 26. Pairs of such holes may then be aligned and engaged over pins in a jig to locate the correct position for welding.

After completion of the insole 22 as shown in FIG. 11, the only operations remaining will normally be the fitting of an insole at the heel region and then the fitting of the outer sole. The lasting of the heel can normally be done very rapidly on a heel tacking machine using a short insole or heel portion which overlaps slightly the insole 22. The resulting upper can then be directly fitted (without any further lasting) to a shoe former of an injection moulded soling machine and presented to the machine for forming the outer sole in situ. Furthermore it will be appreciated that the insole (or sock) will be distended during forming and, because of the heating and cooling cycle will remain in its distended shape when cool. Some recovery of the original shape, or shrinkage, may be effected by localised re-heating, e.g., by radiant heat or hot air. This recovery process may be used to enable inaccuracies in the positioning and configuration of the cut-weld 26 to be compensated. Furthermore it facilitates drawing the tear-seal periphery accurately to its required position whilst on the former thus permitting tolerances in the preceding fabricating operations.

During the shrinking of the insole the outer and lining are maintained in their correct shape on a last or former. The former of an injection-moulded soling machine is suitable. The heat treatment may be performed as part of a heat setting treatment as for example described in British Pat. No. 1,302,033.

It is convenient to form a back seam by turning the preformed upper inside out and welding a closed seam (especially where the seam is at the heel). The inside out operation is then reversed. The seam may be smoothed by heat treatment. It is normally more convenient to do this before removal of the gusset, while the insole portion lies against the lining.

What I claim is:

1. A method of shoe manufacture which includes the steps of preparing a whole upper blank for preforming from materials which are weldable together either alone or with the aid of a heat-activated adhesive by high frequency welding by attaching an outer portion to a lining portion by means of a tear-seal weld extending along the desired top line so that at least some lining material extends unbroken across the weld line to permit preforming of the resulting blank, preforming the blank and subsequently tearing away the waste material.

2. A method as claimed in claim 1 wherein closing shop operations are performed upon the flat blank prior to the preforming operation.

3. A method as claimed in claim 1 in which all the top line configurations are defined by tear-seal welds and the outline of the blank cut in one welding and cutting operation.

4. A method as claimed in claim 1 in which the preforming operation is carried out by clamping the periphery of the blank and stretching the upper material mechanically by means of a male former.

5. A method as claimed in claim 1 in which the preforming operation is carried out by pressure forming or differential pressure forming.

6. A method as claimed in claim 1 in which, in the preforming operation, the combined upper and lining assembly are conformed to a mould having a moulding surface whose shape is substantially that which would be arrived at by forming a shell of resiliently flexible material to the last shape required and partially flattening out the shell by outwardly displacing the side portions thereof, the upper assembly being so held during the conforming thereof to the mould that the upper and lining materials stretch in conforming to the mould.

7. A method of shoe manufacture including the steps of joining an insole portion to an outer portion to form a flat whole upper blank for preforming, preforming the combined blank and removing a gusset from the insole portion so as to give to the insole portion the requisite shape and area of a finished shoe insole.

8. A method as claimed in claim 7 in which an insole portion is joined to the lining or outer portions of the blank by means of a said tear-seal or cut weld along the outline of the forepart, such outline being in the position of the featherline of the finished shoe and extending, together with the insole portion, into the instep region of the shoe.

9. A method as claimed in claim 7 in which the upper portions to be welded together are of wholly thermoplastic material mutually weldable by high frequency welding.

10. A method as claimed in claim 7 in which the said portions are of polyurethane based microporous material.

11. A method as claimed in claim 7 in which the insole portion is composed of thermoplastic material and is subjected to heat treatment after removal of the gusset to cause it to shrink while the shape of the upper is maintained on a last or former.

12. A method as claimed in claim 7 in which the insole portion is of thermoplastic material susceptible to high frequency welding and the gusset is formed by pinching the preformed blank so that the insole portion is folded outwardly away from the outer portion and a tear-seal or cut weld carried out to remove the gusset from the folded insole portion, using a single blade electrode of the necessary length and shape.

13. A method as claimed in claim 12 in which pairs of locating holes are formed in the waste portion of the gusset prior to the outline welding operation the holes of each pair being aligned upon folding of the insole portion and held upon jig pins to determine the weld line for the gusset.

14. A method as claimed in claim 13 in which the blank is of the type requiring closure at a single seam, the seam being closed after the forming operation, before or after removal of the gusset, and in which after the gusset removal operation and seam closure an insole is fitted in the heel region and the resulting upper presented to an injection moulded soling machine for fitment of the sole.

15. A method as claimed in claim 14 in which the back seam is formed by turning the preformed blank inside out, welding a closed seam and reversing the inside out operation.

16. A method as claimed in claim 15 in which closure of the seam is performed prior to removal of the gusset and in which the preforming operation is carried out by clamping the periphery of the blank and stretching the upper material mechanically by means of a male former.

17. A method of shoe manufacture including the steps of
 a. preparing a whole upper blank for preforming from materials which are weldable together either alone or with the aid of a heat-activated adhesive by high frequency welding by attaching an outer portion to a lining portion by means of a tear-seal weld extending along the desired top line so that the lining portion extends unbroken across the weld line to permit preforming of the resulting blank,
 b. joining an insole portion to the lining or outer portions of the blank by means of a said tear-seal or cut weld along the outline of the forepart, such outline being in the position of the featherline of the finished shoe and extending, together with the insole portion, into the instep region of the shoe,
 c. preforming the blank,
 d. tearing away waste lining material from the top line region of the preformed blank,
 e. completing the last remaining seam of the preformed blank to provide a continuous upper surface,
 f. fitting an insole in the heel region,
 g. shrinking the insole while the outer and lining are maintained in shape,
 h. soling the shoe
wherein step (c) is performed subsequently to steps (a) and (b), the remaining steps are performed subsequently to step (c) and step (h) is performed last.

* * * * *